May 3, 1966 — M. B. LAMAR — 3,248,820
FISH LURES
Filed July 20, 1961 — 2 Sheets-Sheet 1
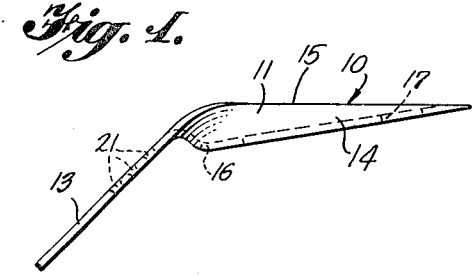
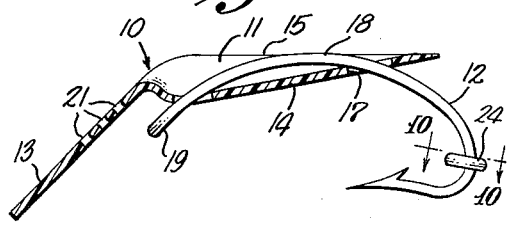
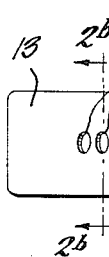
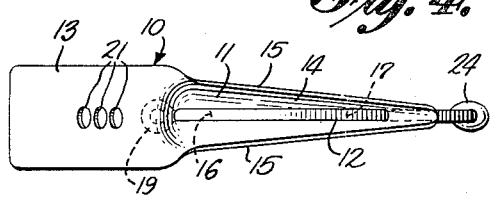
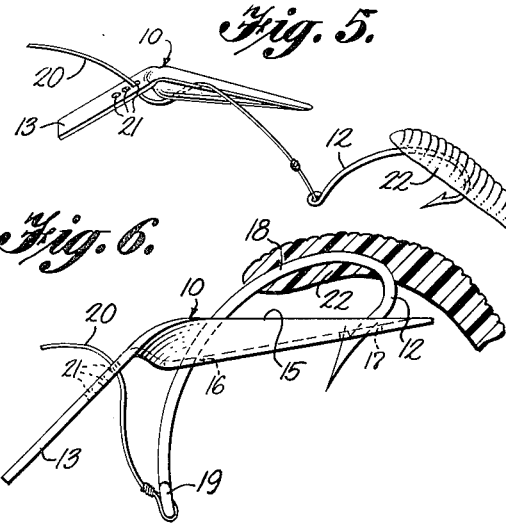
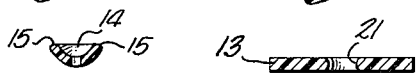
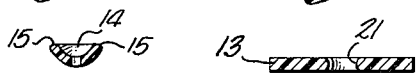
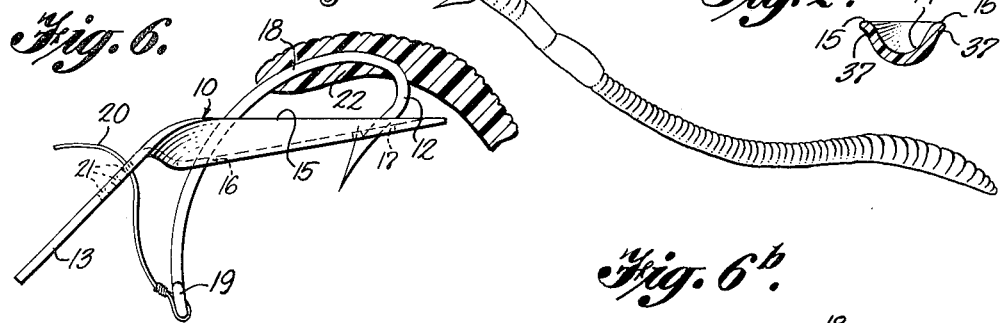
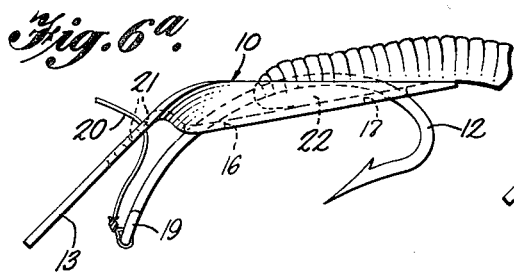
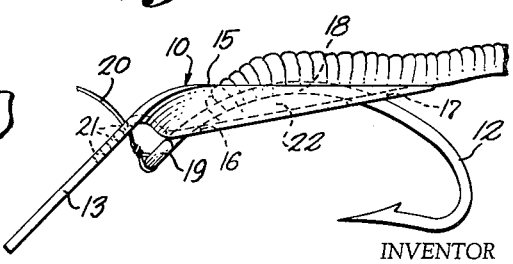
INVENTOR
Mirabeau B. Lamar
BY Mason, Fenwick & Lawrence
ATTORNEYS May 3, 1966 M. B. LAMAR 3,248,820
FISH LURES
Filed July 20, 1961 2 Sheets-Sheet 2
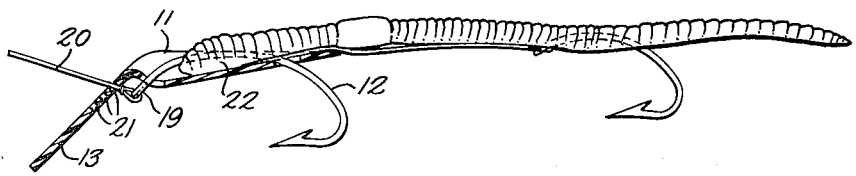
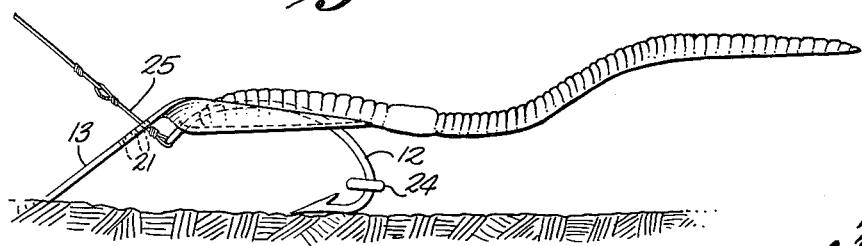
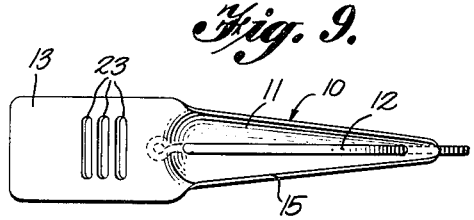
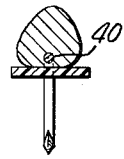
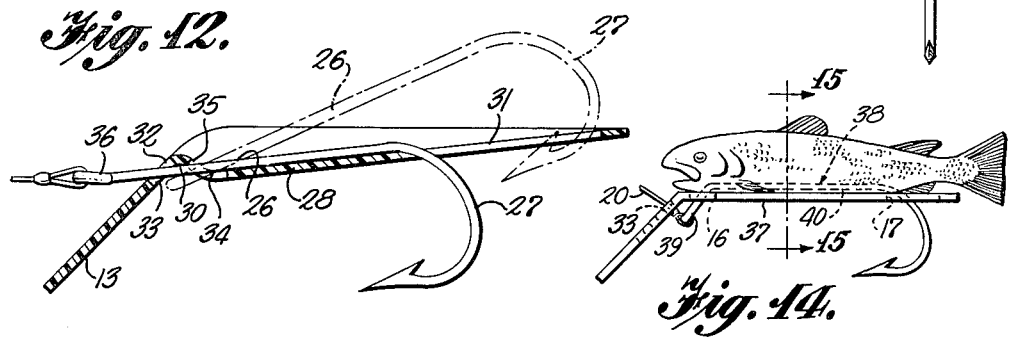
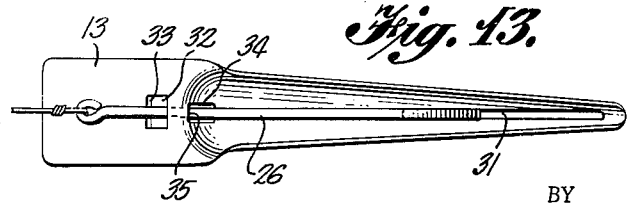
INVENTOR
Mirabeau B. Lamar
BY Mason, Fenwick & Lawrence
ATTORNEYS

United States Patent Office 3,248,820
Patented May 3, 1966

3,248,820
FISH LURES
Mirabeau B. Lamar, 1530 N. Lancaster St., Arlington, Va.
Filed July 20, 1961, Ser. No. 125,518
1 Claim. (Cl. 43—42.29)

This invention is a continuation-in-part of my application for Patent Serial No. 48,714, filed August 10, 1960, entitled Fish Lures and which has been abandoned.

This invention relates to artificial fish lures of the type in which the artificial lure is combined with a natural or artificial bait, the lure being so constructed as to acquire a yawing oscillation when drawn through the water, which imparts a sinuous movement to the body of the bait suggestive of swimming. Due to its function of transmitting lifelike motion to the body of the bait, the lure of the present invention may well be denominated a bait body activator.

One of the objects of the invention is the provision member formed with a deflecting plate at the fore and a trough or cradle extending longitudinally rearward from said plate, the other component comprising a fishhook in detachable interengagement with the bottom of said cradle, constructed to impale an appreciable longitudinal portion of the anterior part of a bait body, and clamp it longitudinally to the bottom of the cradle, leaving the posterior of the bait body free to trail behind the activator.

Another object of the invention is to provide a bait body activator as described, in which the fishhook intersects the bottom of the cradle at spaced points, passing through longitudinal slots therein, the eye and barb ends of the fishhook being normally below the cradle, and the intermediate portion of the shank of the hook, upon which the bait body is impaled bridging the slots on the upper side of the cradle, the bait body being pinned to the cradle by the hook.

Still another object of the invention is the provision of a bait body activator as described in which the hook is so shaped and the slots in the cradle so disposed, that the hook is slidable in one direction relative to the cradle to release the hook, and in the other direction to lock the hook, the locking function being supplemented by the wedging of the impaled portion of the bait body between the shank of the hook and the cradle.

A further object of the invention is the provision of a bait body activator as described in which the fishhook may be detached from the cradle component, and the latter pushed along the fish line to a convenient distance from the hook, facilitating the re-baiting of the hook with a fresh bait body.

Another object of the invention is to provide a bait body activator according to the above description in which the sides of the cradle converge rearwardly, and the upper edges of the sides incline progressively downwardly, whereby the cradle comes substantially to a point in the plane of its bottom, and the bait body immediately to the rear of the part pinned to the cradle is exposed at the sides so that the bait body will not oscillate abruptly about a constant point, but will ride laterally upon the inclined edges of the cradle with gradual braking effect, and also present a greater portion of its length to the view of the fish, and also give access to the fingers close behind the impaled portion, whereby the bait body may be firmly held between thumb and finger and pushed forwardly into wedged position betwen the shank of the hook and the underlying part of the cradle.

A further object of the invention is the use of the cradle component of the bait activator as a lure complete in itself with the provision of a fishhook, but without the attribution of the bait body pinning function or activation of a bait body.

Other objects of the invention will appear as the following description of a practical embodiment, and certain modifications thereof proceeds.

In the drawings, throughout the figures of which the same reference characters have been employed to designate identical parts:

FIGURE 1 is a view in side elevation of the cradle component of the bait body activator;

FIGURE 2 is a plan view of the cradle component shown in FIGURE 1;

FIGURE 2a is a cross-section taken along the line 2a—2a of FIGURE 2;

FIGURE 2b is a cross-section taken along the line 2b—2b of FIGURE 2;

FIGURE 2c is a cross-section taken along the line 2c—2c of FIGURE 2;

FIGURE 3 is a longitudinal section in a medial vertical plane of the complete bait body activator;

FIGURE 4 is a plan view of the complete activator shown in FIGURE 3;

FIGURE 5 is a perspective view of both components of the bait body activator, in separated relation but associated with a fish line, the cradle component being shown pushed along the line to some distance from the fishhook, giving room for unimpeded baiting of the fishhook;

FIGURES 6, 6a and 6b are sequences showing in side elevation successive positions of the fishhook relative to the cradle slots, in corresponding steps of the procedure in baiting the hook;

FIGURE 7 is a longitudinal vertical section of the bait body activator, with attached bait body showing the hitch of a "tail stinger" hook about the bight of the fishhook component;

FIGURE 8 is a view in side elevation showing the normal stance of the baited activator when resting on the bottom;

FIGURE 9 is a view similar to FIGURE 4, showing an alternative shape of the apertures in the deflector plate;

FIGURE 10 is a fragmentary view in cross-section taken along the line 10—10 of FIGURE 3, showing the weight in loose relation to the hook;

FIGURE 11 is a view similar to FIGURE 10, showing the weight tight against the hook;

FIGURE 12 is a view in longitudinal vertical section, of a modified form of the invention, the released position of the hook being shown in broken lines;

FIGURE 13 is a plan view of the same;

FIGURE 14 is a view in side elevation of a modified form of the invention, in which the cradle portion of the activator is transversely flat and the shank of the hook rectilinear.

Referring now in detail to the several figures, the numeral 10 designates the bait body activator as a whole, while comprises a preferably molded or stamped cradle component 11, which may be of metal, plastic or other suitable material, and a fishhook component 12, usually of metal, which in addition to its fish catching function cooperates with the component 11 in pinning the bait body to the cradle component, also serving as a keel-like balance, and enabling the attachment of the line direct to the eye of the hook. The component 11 is formed forwardly with a flat, downwardly deflecting plate 13, and rearwardly with a trough-like cradle 14 integrally joined to the deflector plate. The shape of the cradle adjacent its junction with the deflector plate is as though it were originally a planiform continuation of the deflector plate, bent downward at an obtuse angle thereto, then pinched in at the sides in such a way as to depress the portion between the side edges to form the trough-like cradle, which is curved in transverse section substantially throughout its length. The sides of the cradle converge toward the rear, and the upper edges 15 of the sides incline downwardly from the front so that the cradle terminates at the rear substantially in a point. The upper edge portions of the sides of the cradle preferably flare outwardly along the anterior portion of the cradle, as shown at 37 in FIGURES 2 and 2c, but the flare progressively diminishes as the sides decrease in height so that it disappears in the region of the rearward slot, as evidenced by the cross-section in FIGURE 2a. The component 11 may be of any color, but is preferably transparent.

The deflecting plate is a well known feature in artificial lures or plugs, alternately tilting from side to side as it is drawn through the water, imparting a yawing movement to the lure which simulates the swimming movements of a worm-like or eel-like denizen of the water. The activator of the present invention, by itself, that is, without bait could be used as a lure, but such use is incidential to the invention.

Almost any bait, artificial or natural can be employed with the bait body activator, but it finds its fullest expression of function when used with bait having an elongated body capable of undulating movement such as a worm, eel, eel skin, or pork rind. In the present illustrative embodiment of the invention, the bait used, except in the modifications, is an artificial worm.

The underlying principle of the present invention is that if the anterior portion of an elongated flexible body having appreciable length, be held and oscillated, an undulating wave movement will be transmitted throughout the length of the body beyond the portion so held. This can be illusrated by a length of rope. If an end portion is held firmly in the hand and oscillated by a wrist movement, waves of movement will continually run through the length of the rope. It is not so with a rope having its end tied into the eye of an eye bolt, with the shank of the eye bolt held in the hand and moved back and forth. In such case, most of the effort of oscillation is lost in pivotal movement between the eye and the end of the rope. The difference in result stems from the fact the rope is not sufficiently limber to bend hingedly about a point, but extends the bend through an arc and therefore transmits the full oscillatory impulse received from the source. For this reason the behavior of a bait body dangling at its front end from an oscillating hook, when drawn through the water, is quite different from that of a bait body having an appreciable length of its front portion fastened so as to oscillate with the oscillating lure to which it is attached.

The cradle is formed with a pair of longitudinally spaced longitudinally elongated closed slots 16 and 17, in its bottom wall, one being at the front and the other at the rear.

The hook component 12 of the bait body activator is a spealicized fishhook particularly designed to cooperate with the cradle component in pinning the bait body to the cradle in such a way that a portion of the bait body is held relatively immovable thereto, and permitting the ready release of the two components, for re-baiting. With this end in view, the shank 18 of the hook is formed with a sweeping curvature that extends smoothly from a point adjacent the eye 19, into the bight portion of the hook. Specifically, the curve shown is one of progressively decreasing radius, but such a precise curve is not essential. When the hook and cradle are in their correlated bait body pinning position shown in FIGURE 3, an intermediate portion of the shank bridges the space between the slots in an upwardly convex arc, the shank being interwoven with the cradle, extending upward through the forward slot and downward through the rearward slot contacting the extreme ends of said slots, the opposite ends of the hook underlying the bottom of the cradle beyond the extreme ends of said slots. The plane of the eye is perpendicular to the plane of the bight.

The hook is slidable with respect to the slots and may be pushed in a forward direction to bring the bight to a position in which it can pass through the rearward slot 17, by tilting the hook upward, as shown in FIGURE 6, so as to move the bight end entirely to the upper side of the cradle. From this position the bight of the hook is rotated through an angle of 90° to align the eye with the forward slot 16, allowing the eye end of the hook to be pulled through said slot and the hook thus disengaged from the cradle component of the activator, which is the preferred thing to be done, for convenience and celerity in impaling the bait body upon the hook. However, it is not necessary to separate the hook from the cradle component for re-baiting. The hook need not be turned through a 90° angle, but left with the eye in its normal position beneath the forward slot and tilted upward, pivoting in the eye to the desired angle at which to impale the bait body.

FIGURES 5, 6, 6a and 6b illustrate the procedure in baiting the activator, the fish line 20 being shown attached to the hook and passing through a selected one of the apertures 21 of the longitudinal series with which the deflector plate 13 is provided. The bait body shown is a known article of purchase, representing an earth worm and being made of flexible plastic having the property of elastically recovering its shape after being deformed, or it may be a natural worm.

In FIGURE 5 the hook component has been disengaged from the cradle component and drawn away from the cradle component a sufficient distance to enable the impaling of the bait body to be done unimpeded by the proximity of the cradle component. The pointed end of the hook is pushed into the bait body and made to penetrate an appreciable longitudinal distance somewhat less in length than the distance between the outer ends of the slots 16 and 17. The penetration should be sufficiently deep to provide a compressive cushion portion 22 below the shank of the hook. The hook with the impaled bait body is now brought up to a position above the cradle and the eye inserted downwardly through the slot 16. Then the hook is turned to bring the bight end parallel to the slot 17, and the pointed end is introduced into said slot. This is the position of parts shown in FIGURE 6. The hook is now pushed down by tilting it toward a horizontal position, until the bulge of the bight has passed through the slot as shown in FIGURE 6a, in which figure the portion 22 of the bait body is shown confined beneath the bowed shank of the hook. The shank is now slidably shifted toward the rear of the cradle by pulling force applied to the bight of the hook. The bait body opposes frictional resistance to the passing through it of the shank, but the bait body is immobilized through contact with the cradle and the portion of the shank adjacent the slot 17 and has to yield to the passage of the shank. The position of parts at this stage is illustrated in FIGURE 6b.

The last step in affixing the bait body and hook to the cradle component is to push the impaled bait body forward between the shank and cradle while pulling the hook rearwardly by the bight end, thus locking the parts in place. The edges of the sides of the cradle have been described as inclining downwardly toward the rear. As the height of the sides thus diminishes, the sides of the portion of the bait body within the cradle are exposed, so that the bait body can be grasped between thumb and finger close to the impaled portion and pushed forward until firmly compressed within the wedge-like space between the forward end of the bridging portion of the shank and the bottom of the cradle. The elastic recovery property of the compressed mass 22 causes it to press it against the shank and holds it in tension against the cradle at the ends of the slots. Due to the reluctance of the compressed mass to move relative to the shank, it will not back off from its wedged position.

The provision of the longitudinal series of apertures in the deflector plate 13 permits selective variation in the angle of attack of said plate with the water. If the line is passed through a lower aperture, the effect, when the line is taut is for the plate to be tilted closer to a horizontal plane than when the line is passed through an upper aperture, and for the cradle to dip correspondingly. This variation affects the depth at which the activator will travel at a given water speed and also to an extent modifies the oscillating action of the activator since the direction of the axis about which it oscillates changes with the attitude of the deflector plate.

A modification of the apertures is shown in FIGURE 9, in which they have the form of parallel transverse slots 23. These give the advantage of permitting unimpeded yaw of the deflector plate under a taut line within the limits determined by the length of the slots.

FIGURE 3 shows a small weight 24 embracing the bight bend of the hook component 12. This weight may be an open loop of readily bendable metal such as lead, as shown in FIGURES 10 and 11. The ends of the loop may be brought together about the hook by finger pressure sufficiently to have the barb retain the weight on the hook, while leaving it loose, in which case due to the movement of the activator through the water the weight jiggles against the hook, giving forth a ticking sound which is audible for some distance under water and arouses the curiosity of fish. Alternatively, the loop may be pinched tight against the hook, in which case its function is solely that of a weight. Obviously, the weight has to be attached to the hook after the bait body has been pinned to the activator, and has to be removed before the hook can be released from the cradle component. The weight 24, either in its tight or loose adaptation is, due to its low position on the activator particularly effective in maintaining the lure in a horizontally disposed and natural appearing upright position when the hook point is resting on the bottom, keeping the forward portion of the bait body high, especially when the bait body has a suitable degree of buoyancy, so that it can be seen at a distance. The bait body activator is designed to be used with or without the weight. In addition to the sound effect above described, the weight provides greater stability in faster currents and makes possible faster retrieves and trolls. Without the weight the lure is more sensitive to manipulation, oscillates more rapidly, sinks more slowly, and with a buoyant bait body floats at the surface.

The description of the invention thus far has referred to that form of the invention in which the shank of the hook component of the activator is curved so as to penetrate deeply into the bait body and define beneath the curved shank a thick portion of the mass of the bait body that plays a part in the holding of the components of the activator in locked position. In this form of the invention due to the curved shape of the shank of the hook, the eye end of the shank necessarily moves downward when the shank is slid in a forward direction through the slots. In consequence of this downward movement the eye end of the shank is constrained to operate on the under side of the deflector plate, so that the fish line fastened to the eye 19 passes through the deflector plate.

A modification of the invention is illustrated in FIGURES 12 and 13, in which the shank of the hook is shown extended through the deflector plate. Referring to these figures, it is seen that the shank 26 of the hook component 27 is straight from eye to bight, so that the forward portion of the hook does not move downward in shifting the hook longitudinally to move it from locked to released position, and vice versa. The straight shank lies more or less parallel to the bottom of the cradle 28, the proximity of shank and cradle bottom and amount of space between, being determined by the depth of the cradle bottom below the lower extremity of forward slot 34. The bottom of the cradle may be straight, with the shank parallel and close to the bottom, as shown, or the bottom of the cradle may be, obviously, formed to drop lower below the lower extremity of slot 34.

The shank 26 is forwardly extended when it is in working position with the bait body fully secured, and for releasing the hook component the shank has to be pushed inwardly until the eye is within the angular space 30, between the deflector plate and the front of the cradle 28 before the hook can be tilted upwardly. Thus, the directions in which the hook must be pushed relative to the cradle for securing or releasing the hook are the reverse of the directions for performing the like functions in the first described activator.

Due to the straightness of the shank the bight of the hook does not progressively tilt upwardly so as to pass through a relatively small slot, so the length of the rearward slot 31 has to be the full depth dimension of the bight, from the tip of the barb to the end of the hook. The relatively long rearward slot requires that the cradle be proportionately longer than in the first described activator.

The deflector plate is formed with a transverse slot 32 in the path of forward movement of the shank 26 and sized to admit the eye. The lower edge 33 of this slot is substantially in the plane of the longitudinal medial line of the cradle. The forward slot 34 of the cradle extends upward along the front thereof, its upper edge 35 lying in a plane parallel to said longitudinal plane but spaced above said plane a distance equal substantially to the diameter of the shank of the hook. In other words, when the hook component is interengaged with the cradle component, in repose position, that is, without being stressed by the presence of a bait body, with the shank in forward position and resting on the bottom of the cradle, the shank will be substantially in contact both with the lower edge of the slot 33 and the upper edge of the slot 34.

In order to remove the hook from the cradle it is first drawn rearwardly until the eye is within the space 30. This brings the bight portion in registry with the rearward slot 31. The hook is then tilted upwardly to clear said slot, then axially rotated 90° to align the eye with the forward slot 34. The eye portion is drawn upwardly through the slot 34, the line following through. The hook is now pulled away from the cradle component as far as the fisherman may wish, for applying the bait body which, as in the case of the first described activator is impaled in such manner that the shank of the hook penetrates an appreciable longitudinal portion of the bait body, the zone of penetration including the forward portion of the shank. The eye end of the hook is now reinserted through forward slot 34, the penetrated portion of the bait body lying between the shank 26 and the bottom of the cradle. The bight end of the hook is now pressed down through the rearward slot 31, the pressure being carried to the point at which the portion of the bait body between the shank and cradle is compressed. The compressing of the bait body puts a slight camber on the shank of the hook so that it presses upward against the edge 35, the eye end becoming slightly depressed. The hook is now pushed forward to project the eye end through the aperture in the deflector plate. The depressed attitude of the eye end of the hook, as shown in previous figures of the drawing, aids in the threading of the eye, but now it may be advantageous to have the eye 36 slightly bent up inclinedly relative to the shank, as shown in FIGURE 12, so that it will cam upward against the edge 33, assuring the entry of the eye through the aperture in the deflector plate.

The cambering of the shank under the reaction pressure of the squeezed bait body and the resultant resilient pressure upon the respective edges 33 and 35 serve to hold tightly together both components of the activator. Not a great deal of pressure is required, for the pull of the line is directly upon the hook component while the water pressure is in a contradirection upon the cradle component, tending to hold the components together.

Now referring to FIGURES 14 and 15, these disclose a modification of the invention in which the cradle portion 37 of the cradle component is not trough-shaped, as illustrated in the other forms, but transversely as well as longitudinally flat, that is to say, planiform, the deflector plate portion being also planiform. This simple shape adapts the cradle component to be stamped from a flat sheet of suitable material in which the slots 16, 17 and 33 may be simultaneously punched, and the component finished by bending it transversely to demark the deflector plate from the cradle.

It is quite possible to employ a curved hook such as that employed in the bait body activator shown in FIGURE 3, or a straight shanked hook, as illustrated in FIGURES 14 and 15.

Due to the fact that there is no longitudinal depression in the cradle at a lower level than the dihedral apex between the deflector plate and cradle, it is not possible to employ a straight shanked hook having a sliding movement that requires the shank to pass through the deflector plate. Therefor, the hook 38 has the eye end 39 deflected abruptly in a downward direction so as to lie behind the deflector plate when the straight shank 39 is longitudinally parallel to the cradle. Since the hook does not have the capacity to slide into a position in which the impaled bait body is clamped to the cradle, it is not so clamped, but when not being drawn through the water it retains the bait body loosely attached to the cradle. The fish line 20 passes through one of the holes 33 in the deflector plate and is attached direct to the eye of the fishhook. When the line is tensioned in drawing the lure through the water, the hook with impaled bait body moves forward relative to the cradle until the eye portion of the shank contacts the forward end of the slot 16, fulcruming about said edges through the inertia pressure of the water against the deflector plate, causing the shank to press the bait firmly against the cradle. It is to be noted that the length of the hook 38 realtive to the distance between the slots 16 and 17 is such that when it is in the operative position shown in FIGURE 14, the barbed point extends forwardly of the slot 17 so that when the lure is being pulled through the water the bight portion of the hook cannot possibly pass upwardly through the slot 17. However, when the hook is to be re-baited it may be readily tilted upwardly until the pointed end is against the under side of the cradle. In this position the bulge of the bight portion has already passed through the slot and there is sufficient play of the forward deflected portion of the shank in the slot 16 to permit the hook to be shifted rearwardly to permit the point of the hook to pass through the slot 17.

It is to be understood that the cradle component of the bait body activator both in the form in which the cradle is trough-shaped as well as the form in which the cradle is planiform, is to be regarded as an effective lure in its own right, uninvolved with any other component having a combinative relationship thereto, since the fishhook that it would carry, in its unique use, need have no other function than to catch fish.

While I have in the above description disclosed specific practical embodiments of my invention, the details of construction and arrangement of parts are by way of example, and not to be construed as necessarily limiting the scope of the invention.

What I claim is:

In combination, a bait body activator and an elongated flexible bait body, the latter having the quality of elastic reaction to compression, to an appreciable degree, said activator comprising a rigid member formed with a downwardly inclined deflector plate at the front and a trough-like cradle rearwardly of the deflector plate, said cradle having the bottom thereof provided with longitudinally spaced closed ended longitudinal slots adjacent its front and rear, and a fishhook having an overall length greater than the distance between the extreme ends of said slots, and having a shank formed with an outwardly convex curvature extending from its forward end into the bight portion of said hook, said hook and cradle being interengaged through the passage of the shank downward through the forward and rearward slots, whereby the intermediate portion of said shank arcuately bridges the space between said slots, above said bottom, a forward portion of said bait body being longitudinally impaled upon the intermediate portion of said shank and pressed thereby between said shank and bottom, said hook being slidable forwardly relative to said cradle, guided by said slots to move in a curvilinear path, presenting the bight portion thereof to the rearward slot in a position to be freely passed through it to the upper side of said cradle, in position for re-baiting said hook or separating it from said cradle.

References Cited by the Examiner

UNITED STATES PATENTS

| | | | |
|---|---|---|---|
| 889,505 | 6/1908 | Bingenheimer | 43—44.8 |
| 958,233 | 5/1910 | Curtiss | 43—42.19 |
| 1,993,018 | 3/1935 | Pfeifle | 43—42.1 |
| 2,021,796 | 11/1935 | Liotta | 43—42.28 X |
| 2,375,290 | 5/1945 | Docteur | 43—42.28 X |
| 2,462,828 | 2/1949 | Parnell | 43—42.24 |
| 2,507,454 | 5/1950 | Nelson | 43—42.52 X |
| 2,582,646 | 1/1952 | Moore | 43—44.2 X |
| 2,618,096 | 11/1952 | Wagner | 43—42.23 X |
| 2,700,240 | 1/1955 | Gibbs | 43—42.52 X |
| 2,781,604 | 2/1957 | Brown | 43—42.28 |
| 2,812,609 | 11/1957 | Lema | 43—42.28 |
| 2,871,611 | 2/1959 | Shepard | 43—44.2 |
| 2,886,914 | 5/1959 | Lievense | 43—42.15 X |

FOREIGN PATENTS 54,891  2/1935  Norway.

SAMUEL KOREN, *Primary Examiner.*

ABRAHAM G. STONE, *Examiner.*